United States

Thiele et al.

[45] 3,701,309

[45] Oct. 31, 1972

[54] PHOTOGRAPHIC CAMERA WITH MOTORIZED FOCAL LENGTH AND DISTANCE ADJUSTMENT OF THE OBJECTIVE

[72] Inventors: Heinz Thiele, Leinfelden; Dietrich Becker, Stuttgart; Roland Hochstein, Stuttgart; Horst Rockstroh, Stuttgart; Hans Lieckfeldt, Stuttgart, all of Germany

[73] Assignee: Zeiss Ikon Aktiengesellschaft, Stuttgart-S, Germany

[22] Filed: Nov. 2, 1970

[21] Appl. No.: 86,213

[30] Foreign Application Priority Data

Nov. 4, 1969 Germany..........P 19 55 317.4

[52] U.S. Cl. .........................95/45, 350/187, 355/56
[51] Int. Cl. ...............................................G03b 3/10
[58] Field of Search .......95/45, 44; 350/187; 355/55, 355/56

[56] References Cited

UNITED STATES PATENTS

3,158,076  11/1964  Back et al......................95/45
3,561,343  2/1971  Plummer...................95/45 X

*Primary Examiner*—Samuel S. Matthews
*Assistant Examiner*—Richard A. Wintercorn
*Attorney*—Singer, Stern & Carlberg

[57] ABSTRACT

A photographic camera is provided with an objective whose focal length and distance are adjusted by a motorized control device which includes at least one one-armed lever pivotally supported at one end in the camera housing and having at its other free end a manually operable handle for initiating the operation of two motors, one of which effects an adjustment of the focal length while the other effects a distance adjustment of the objective.

In one embodiment of the invention two one-armed levers are employed which are disposed parallel to one another and are operatively connected with each other in such a manner that either one of the same may be used to effect a motorized adjustment of the focal length and the distance of the camera. The free ends of these two one-armed levers extend horizontally in opposite directions and each of said free ends has an operating handle attached thereto.

In another embodiment of the invention the one-armed lever is provided with a handle which is slidable along the outer camera wall and carries an actuating member for a switch which controls a focusing motor. A second handle which is axially movable into a recess of the first handle is operatively connected with a slidable member which is slidably and also pivotally mounted on a stationary pin in the camera housing. When the second handle is pushed into the first handle the slidable member operates a switch which controls a focal length adjusting motor.

6 Claims, 6 Drawing Figures

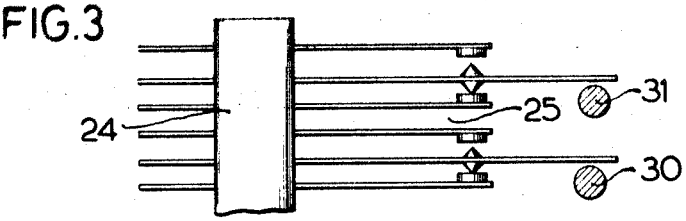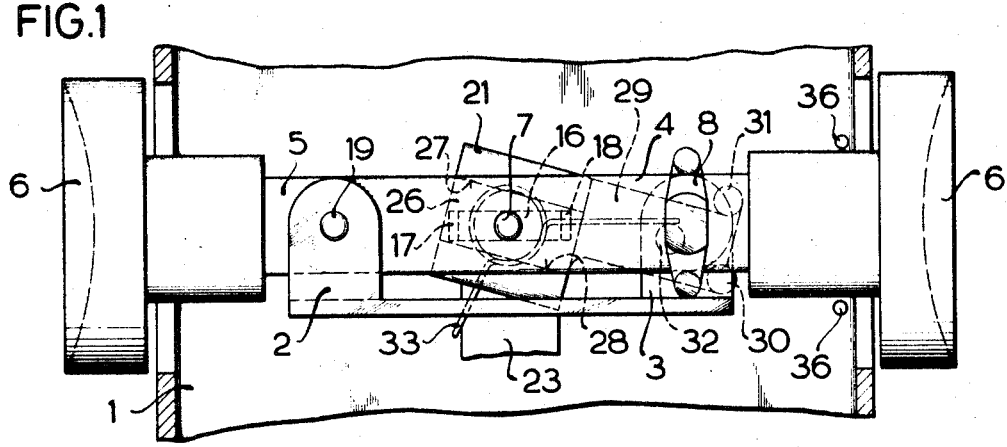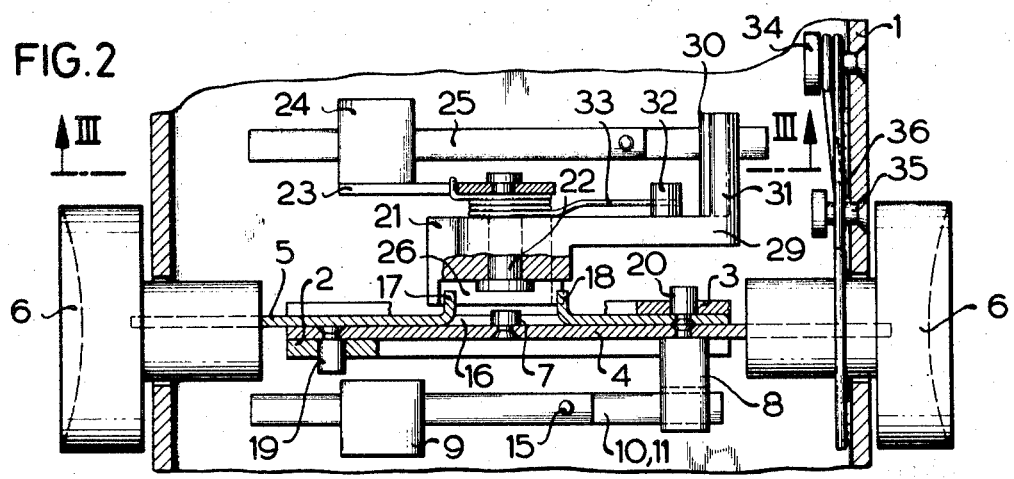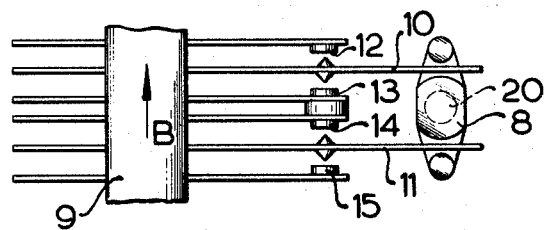

PHOTOGRAPHIC CAMERA WITH MOTORIZED FOCAL LENGTH AND DISTANCE ADJUSTMENT OF THE OBJECTIVE

The invention relates to a photographic camera whose objective is provided with a motorized adjustment device for the focal length and the distance.

Photographic cameras of this type have the advantage of a convenient operation when performing the focal length adjustment, as well as the focusing adjustment of the objective. It is also known in cameras with motorized adjustable focal length to connect during the pivotal movement of a sharpness indicator the adjustment motor for the focal length so that this motor changes the focal length of the objective toward the longer focal length, unless this long focal length has already been adjusted. After this, the sharpness adjustment is effected manually.

It is an object of the invention to combine the advantages of the described devices in a particularly suitable manner.

In accordance with the invention, a photographic camera with an objective provided with a motorized focal length and distance adjusting device is provided with means which sharply adjusts the objective and provides an impulse for an automatic adjustment of the objective toward the long focal length. This purpose is then particularly fulfilled by switching members which are in operative connection with the operating handle which performs a motorized focusing, whereby when this handle for the motorized focusing is actuated the adjustment of the objective toward the long focal length is effected regardless in what direction the focusing takes place.

In accordance with the invention, the operating handle for the motorized focusing device is provided with means for operating the focal length adjustment device and the focusing device in such a manner that during its actuation first the focal length adjusting device and thereafter the focusing device is operated.

It is particularly suitable when the operating element for the motorized focusing device may be movable into different operating positions.

According to a further embodiment of the invention, the motorized focusing device may be equipped with two oppositely arranged operating handles in which the oppositely arranged operating handles may be moved in two different directions.

A particular suitable embodiment of the inventive constructions may consist in an operating handle which is secured on the free end of a one-armed lever which carries an actuating member for the switch of the focusing motor and an actuating member for a switch of the focal length adjusting motor. The actuating member for the switch of the focal length adjusting motor may consist of one or two parts and is provided with two abutments which are spaced from one another and which are bridged by a rotatable coupling member which acts upon the switch for the focal length adjusting motor, whereby the stationary axis of rotation of the coupling member is disposed between said two abutments. This rotatably coupling member is subject to the action of a spring so that it engages with oppositely arranged limiting surfaces of a recess against one of said abutments. The distance between the oppositely disposed limiting surfaces of the recess is so dimensioned that the recess during the cooperation with said abutments on the one-armed lever leaves sufficient space for the switching movements of the one-armed lever for connecting and disconnecting of the focusing motor and of the focal length adjusting motor. For the actuating member of the switch for the focusing motor is provided a center position forming the rest position with respect to this switch, so that during the movement of the one-armed lever in the one direction the focusing motor rotates in one direction, while during the movement of the one-armed lever in the other direction the focusing motor is rotated in the other direction.

This arrangement of the control device, particularly the arrangement of the rotatable coupling member has the effect that the focal length switch operates the focal length adjusting motor always only in the direction toward the long focal length, regardless in what actuating direction the operating handle for the switch of the focusing motor is moved.

When employing oppositely disposed operating handles for the motorized focusing operation the construction of the same may be made particularly favorable in that the one-armed levers on which the operating handles are secured are arranged one next to each other in parallel and are connected with each other by a pin and slot connection, whereby one of the two one-armed levers is provided with the fixed abutments for cooperating with the recess in the rotatable coupling member; while the other one-armed lever carries the actuating member for the switch of the focusing motor. This pin and slot connection between said two one-armed levers is arranged between the two fixed abutments, preferably in the center between the bearings of the one-armed levers.

Another embodiment of the invention may consist in that one operating handle is formed of two separate handle grips of which one may enter into the other against the action of a spring. The entering first handle grip is secured on one end of a slidable member which on one hand is slidable along its longitudinal axis and on the other hand is pivotally supported on a stationary bearing axis. The second handle grip, however, is movable transversely to the longitudinal axis of the slidable member along the wall of the camera housing. The mentioned slidable member is associated with a switch for connecting and disconnecting the focal length adjusting motor for adjustment toward the long focal length and with another switch for connecting and disconnecting the focusing motor in the one or other direction of rotation in such a manner that during the inward movement of the first handle grip and the resulting movement of the slidable member in its longitudinal direction the switch for controlling the focal length adjusting motor is actuated while during the movement of the second handle grip simultaneously with the first handle grip along the outer housing wall in the one or the other direction and the resulting pivotal movement of the slidable member the switch for starting the focusing motor is actuated in the one or other direction.

Finally the feed circuit for the focal length adjusting motor which is controlled by the operating handle for the switch of the focusing motor may be disconnected automatically when during the focusing operation the optimum focal length adjustment has been reached.

In the following the invention will be described in greater detail with reference to the accompanying drawings which illustrate two embodiments of the invention whereby, however, those parts which are not absolutely necessary for the understanding of the invention have been omitted for the purpose of making the features of the invention more readily understood. In the drawings:

FIG. 1 illustrates a portion of a camera housing in which the device in accordance with the invention is arranged;

FIG. 2 is a top elevation view of the device illustrated in FIG. 1;

FIG. 3 is a sectional view along the line III—III of FIG. 2;

FIG. 4 illustrates an elevation view of the focusing switch according to FIG. 2 and viewed in the direction of the arrow B.

Figure 5:
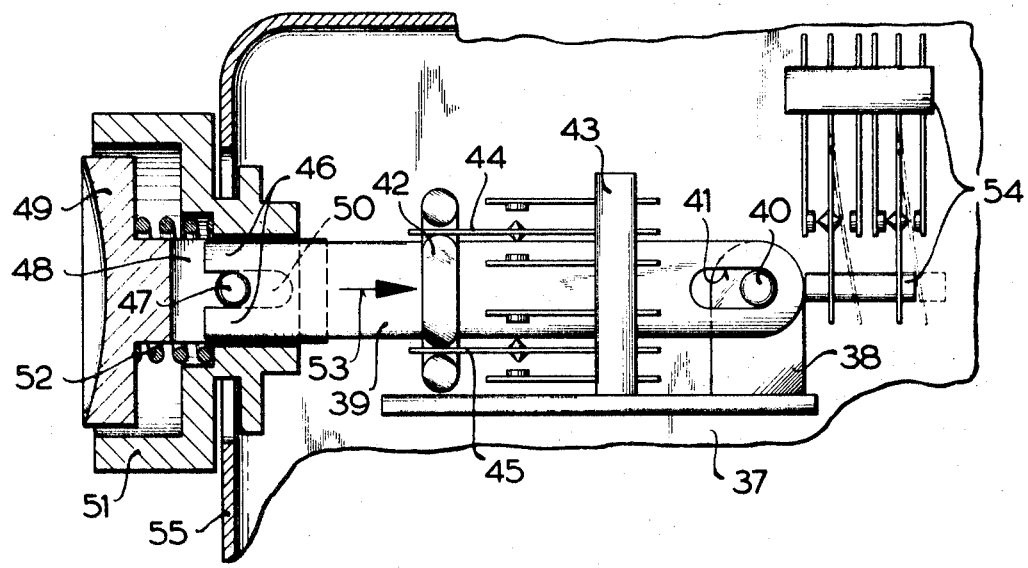
FIG. 5 illustrates a portion of a camera housing in which is arranged another embodiment of the device of the invention.

Referring to the drawings, a camera housing 1 is provided in its interior with two horizontally spaced bearings 2 and 3 in which are pivotally supported two substantially horizontally disposed one-armed levers 4 and 5 with one of their ends. These levers 4 and 5 are disposed parallel to one another and next to one another. The two free ends of these one-armed levers 4 and 5, which are opposed to one another, are provided each with a handle 6 which projects from the camera housing 1. The one-armed lever 4 carries a bolt 7 between its ends and spaced therefrom is secured to the one-armed lever 4 an actuating member 8 for a switch 9 which controls a not-illustrated focusing motor. The actuating member 8 is in operative connection with switching tongues 10 and 11, which in their rest position are disposed between contact carrying leaf springs 12, 13 and 14, 15, respectively. Depending upon the direction of movement of the actuating member 8 contacts may be made between 10 and 12 or 11 and 14 or between 10 and 13 or 11 and 15. Accordingly, the focusing motor of the camera is selectively connectable so as to rotate in one or the other direction. The bolt 7 on the one-armed lever 4 projects into a slot 16 provided in the other one-armed lever 5. This slot 16 is produced by stamping from the body of this one-armed lever 5 two tongues 17 and 18 outwardly, whereby these tongues 17 and 18 are employed as abutments. The one-armed levers 4 and 5 are mounted on pins 19 and 20 which engage bearing apertures in the bearings 2 and 3. A rotatable coupling member 21 is mounted on a stationary shaft 22 which by means of a bearing plate 23 and the housing 24 of a switch 25 for the control of the feed circuit of a not-illustrated focal length adjusting motor is connected with the camera housing. The rotatable coupling member 21 is provided within its one face with a recess 26 having two parallel and straight boundary faces 27 and 28. The recess 26 bridges the two spaced tongues 17 and 18 on the one-armed lever 5. The width of the recess 26, namely the distance between its straight boundary faces 27 and 28, is so dimensioned that the tongues 17 and 18 have sufficient movement of play in the recess 26 for the switching movement of the one-armed levers 4 and 5.

The rotatable coupling member 21 is provided with an outwardly extending switching arm 29 at the outer ends of which are arranged two switching pins 30, 31 and a cam 32. The cam 32 is engaged by a leg of a leg spring 33 which concentrically surrounds the shaft 22. The other leg of the spring 33 engages the bearing plate 23. This leg spring 33 tries to hold the rotatable coupling member 21 always in a rest position which corresponds to the off-position of the switch 25 for the motor of the focal length adjusting device. This off-position is illustrated in FIG. 3. Another leg spring 36 is arranged on a stationary pin 34 attached to a wall of the camera housing 1 and engaging another stationary pin 35 clamps in a predetermined operative position one of the handles 6 with both its legs in such a manner that the two one-armed levers 4 and 5 are maintained always in a rest position which corresponds to the central position.

The operation of the control device illustrated in the FIGS. 1 to 4 is substantially as follows:

In the starting position illustrated in these figures neither the focusing motor of the camera nor the focal length adjusting motor are in operation. If now the handle 6 on the one-armed lever 4 is, for instance, moved downwardly then this one-armed lever 4 by means of its bolt 7 and the slot 16 in the other one-armed lever 5 moves the one-armed lever 5 in such a manner that the latter is pivoted about its pin 20 in the bearing 3 and also is moved downwardly. During this pivotal movement of the tongue 17 of this one-armed lever 5 is urged against the lower limiting surface 28 of the recess 26 (FIG. 1) and rotates the rotatable coupling member 21 counterclockwise. This movement of the rotatable coupling member 21 is transferred by the pins 30 and 31 to the switching tongues of the switch 25. The focal length adjusting motor is now connected for adjusting the focal length of the objective toward the long focal length. The actuating member 8 for the switch 9 of the focusing motor which is moved with the one-armed lever 4 downwardly establishes now an electrical connection between the switching tongues 10 and 11 and the contact carrier 13 and 15. Accordingly, also the focusing motor is caused to rotate in one direction. The connecting position of the rotatable coupling member 21 and the actuating member 8 may be adjusted in such a manner that at first the switch 25 is closed and thereafter the switch 9 is closed for causing the focusing motor to operate. The operator can now observe when the adjustment of the objective to the long focal length has been completed and thereafter he operates the handle 6 further in the same direction in order to start the focusing motor. If the operator now discovers that the rotatable direction of the motor which he has selected is wrong because the object to be photographed appears less and less sharply, then he reverses the actuating direction of the handle 6. In fact, he moves the handle 6 upwardly beyond the central rest position. During this movement, the tongues 17 and 18 are also pivotally moved upwardly and the tongue 18 engages the upper limiting surface 27 (FIG. 1) in the recess 26 of the rotatable coupling member 21. Also during this movement of the one-armed levers 4 and 5 in an upward direction, the rotatable coupling member 21 is rotated counterclockwise into its connecting position for the switch 25. If the handle 6 is correspondingly moved sufficiently upwardly then electrical connections are produced between the switching tongues 10 and 11 and the contact carriers 12 and 14. The result is that the focusing motor is now caused to rotate in the other direction until the objective has been sharply focused.

The FIGS. 1 to 4 illustrate clearly that the described control arrangement operates in the same manner when the right-hand handle 6 on the one-armed lever 4 is first moved upwardly and then downwardly. Obviously, it is possible with this first selected actuating movement to select the correct direction of rotation of the focusing motor. It is also obvious that the same control operation may be effected by actuating the left-hand handle 6 on the one-armed lever 5.

A photographic camera equipped with this switching device of the invention is just as conveniently operable by right-handed and left-handed persons. The arrangement of the two oppositely disposed handles 6 may also be used by the operator as indicators for right-hand rotation and left-hand rotation.

In the modified embodiment of the invention illustrated in FIG. 5 a bearing 38 which is stationary in the camera casing supports pivotally a substantially horizontal slidable member 39. The connection between the bearing 38 and the slidable member 39 is effected by a bolt 40 mounted in the bearing 38 and a horizontal slot 41 provided in the slidable member 39. The slidable member 39 carries between its ends an actuating member 42 for the switch 43 of a focusing motor, and the horizontally disposed yieldable contact tongues 44 and 45 of the switch 43 are held by said member 42 in a central position in which the motor is disconnected from said contact tongues 44 and 45. The end of the slidable member 39 which faces away from the bearing 38 is slotted to form a fork and this fork embraces a transverse pin 47 which is secured in a reduced portion 48 of a first handle button 49 which projects into a milled recess 50 of a second handle member 51. The two handle members 49 and 51 are so constructed that the first handle button 49 may be moved axially into the second member 51. Between the handle members 49 and 51 is arranged a helical spring 52 which has the tendency to cause the closed end of the recess 50 in the handle button 49 to be always in engagement with the transverse pin 47 attached to the second handle member 51. When the slidable member 39 is moved in the direction of the arrow 52 then it operates a switch 54 arranged at the right-hand end of the slidable member 39 for starting the operation of the motor for the focal length adjustment in a direction toward the long focal length. The second handle member 51 is mounted on the outer wall 55 of the camera housing 37 and is slidably movable transversely to the direction of the arrow 53.

The operation of the second embodiment of the invention is substantially as follows:

If a motorized focusing operation is to be performed then the operator depresses first the first handle button 49 in the direction of the arrow 53. This has the result that the first handle button 49 is moved deeper into the recessed second handle member 51. The slidable member 39 is moved by the transverse pin 47 in the direction of the arrow 53 and within the limits of the slot 41 slides along the bolt 40 which is mounted in the bearing 38. The right-hand end of the slidable member 39 engages the part of the switch 54 which connects the switch tongues for controlling the operation of the motor which adjusts the focal length so that the switch 54 is closed. Now the operator may wait until the adjusting operation has been completed up to a distance adjustment which produces the optimum focal length. Then the operator, by moving simultaneously the two handle members 49 and 51 transversely to the arrow 53, causes the focusing motor to rotate in the one or other direction. The focusing adjustment takes place in a manner as already described in connection with the first embodiment of the invention. During this adjusting movement of the handle members 49 and 51, the slidable member 39 is pivoted about the bolt 40. The handleability of the two handle members 49 and 51 for moving the same transversely to the direction of the arrow 53 is possible because the handle member 51 which has inserted therein the handle button 49 has the effect that the limiting surfaces in the recess of the handling member 51 are exposed.

It is, of course, also feasible to provide this second embodiment of the control device with two oppositely disposed operating handles, each of which comprises a handle button 49 and a handle member 51. Both described control devices may suitably be constructed in such a manner that the electrical circuit for the connection of the focal length adjusting motor is used for adjusting toward the longer focal length is so selected that this movement compared with the speed of the normal focal length adjustment is accelerated (Rapid movement).

Figure 6:
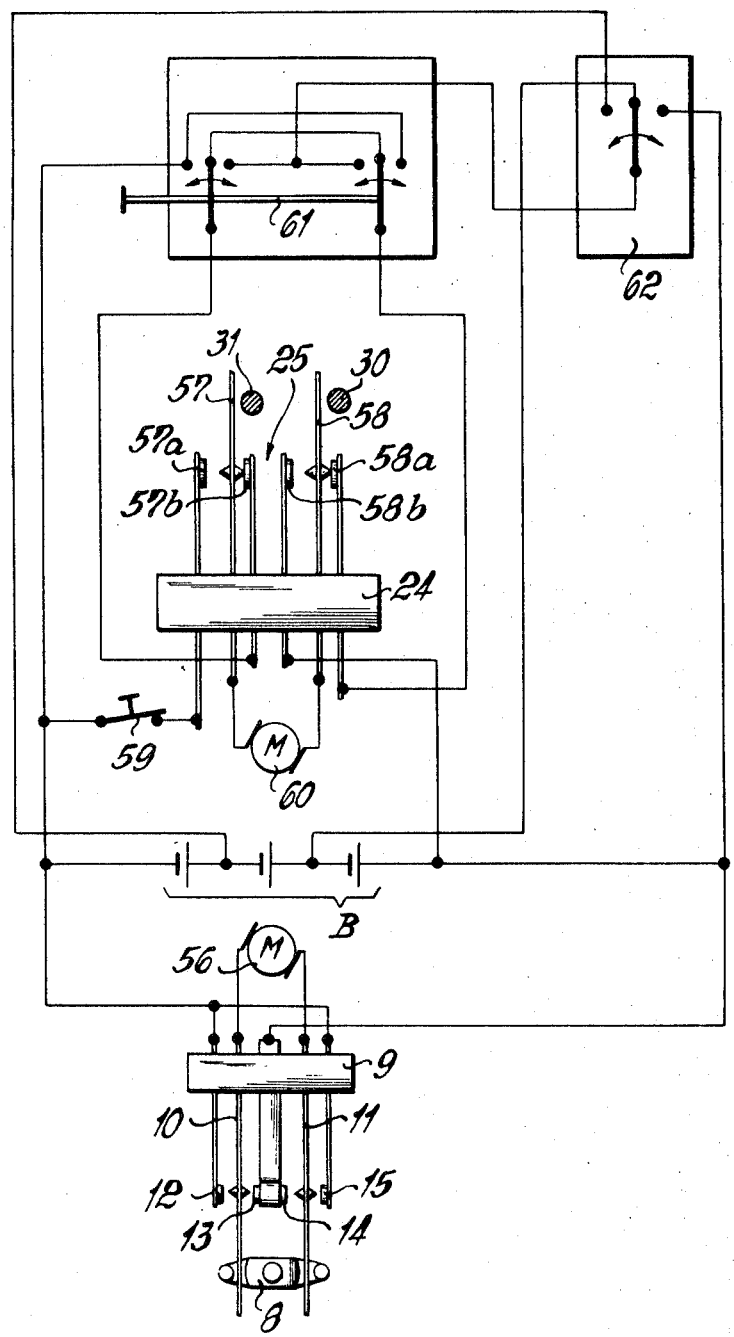
FIG. 6 illustrates the circuit diagram for the focusing and distance adjusting motors.

Referring to FIG. 6, the contact tongues 13, 14 and 12, 15 of the switch 9 are electrically connected with each other and each are also connected to one terminal of the battery B. The focusing motor 56 is connected to the contact tongues 10 and 11.

The contact tongue 57a of the switch 25 serving for the control of the focal length adjusting motor 60 is connected by means of the switch 59, which disconnects the circuit of the motor 60 when optimum focal length adjustment at the sharpest picture has been obtained to one terminal of the battery B, while the contact tongue 58a is connected to the other terminal of this battery. The contact tongues 57 and 58 are connected to the terminals of the motor 60. The contact tongues 57b and 58b are connected with a pole reversing switch 61 which is used for normally causing the motor 60 to rotate in both directions. This switch 61 has three operative positions. In its illustrated center position the voltage of the motor 60 is short-circuited and the motor is braked. In the two other positions the camera objective is either moved toward its long or short focal length position. A speed selection switch 62 is capable of supplying the motor 60 with different voltages, so as to cause the objective to move with different zooming speeds.

During the motorized focusing operation and the associated adjustment of the objective toward the long focal length the focal length adjusting motor 60 is supplied with the fully battery voltage, so that the focal length adjustment controlled by the handle 6 takes place with increased speed as compared with the lower speed of the normal motorized focal length adjustment.

What we claim is:

1. Photographic camera with an objective provided with a motorized focal length and distance adjusting means, including means which focuses the objective and provides an impulse for automatically adjusting the objective toward the long focal length, said means comprising an operating handle (6, 49, 51) for initiating a motorized focusing of the objective, and focal length adjusting means (17, 18, 21, 30, 31, 39) operatively connected with said handle, said handle when being operated to cause a motorized focusing of the objective effecting also an adjustment of said objective toward the longer focal length, regardless of what direction the focusing movement takes place, said above mentioned handle being attached to the free end of a one-armed lever (4, 5) this lever being pivoted adjacent to its other end, an actuating member (8) carried by said lever, a switch (9) for a focusing motor, said switch being arranged to be operated by said actuating member, another actuating member (17, 18, 21), another switch (25) for a focal length adjusting motor and operable by said other actuating member, said one-armed lever being provided between its ends with two spaced abutments (17, 18) and forming a slot therebetween in said one-armed lever, a rotatable coupling member (21) for bridging said two abutments and operatively connected with said other switch for the focal length adjusting motor, a stationary pivot pin on which said rotatable coupling member is mounted, spring means on said pivot pin for causing oppositely arranged parallel limiting surfaces (27,28) formed by a recess (26) in said coupling member (21) to engage one of the said abutments at a time, the distance between said parallel limiting surfaces of said recess being so dimensioned that in cooperation with said abutments (17, 18) on said one-armed lever sufficient clearance for the switching movement of said one-armed lever for starting and stopping of the focusing motor and the focal length adjusting motor is provided, said actuating member (8) for the first mentioned switch (9) of said focusing motor assuming in the rest position a center position with respect to said first mentioned switch (9) so that upon movement of said one-armed lever in one direction the focusing motor is started to rotate in one direction while upon movement of said one-armed lever in the other direction said focusing motor is caused to rotate in the other direction.

2. Photographic camera with an objective provided with a motorized focal length and distance adjusting means, including means which focuses the objective and provides an impulse automatically adjusting the objective toward the long focal length, said means comprising an operating handle (6, 49, 51) for initiating a motorized focusing of the objective, and focal length adjusting means (17, 18, 21, 30, 31, 39) operatively connected with said handle, said handle when being operated to cause a motorized focusing of the objective effecting also an adjustment of said objective toward the longer focal length, regardless of what direction the focusing movement takes place, said above mentioned handle being attached to the free end of a one-armed lever (4, 5) this lever being pivoted adjacent to its other end, an actuating member (8) carried by said lever, a switch (9) for a focusing motor, said switch being arranged to be operated by said actuating member, another actuating member (17, 18, 21), another switch (25) for a focal length adjusting motor and operable by said other actuating member, said one-armed lever being provided between its ends with two spaced abutments (17, 18) and forming a slot therebetween in said one-armed lever, a rotatable coupling member (21) for bridging said two abutments and operatively connected with said other switch for the focal length adjusting motor, a stationary pivot pin on which said rotatable coupling member is mounted, spring means on said pivot pin for causing oppositely arranged parallel limiting surfaces (27,28) formed by a recess (26) in said coupling member (21) to engage one of the said abutments at a time, the distance between said parallel limiting surfaces of said recess being so dimensioned that in cooperation with said abutments (17, 18) on said one-armed lever sufficient clearance for the switching movement of said one-armed lever for starting and stopping of the focusing motor and the focal length adjusting motor is provided, said actuating member (8) for the first mentioned switch (9) of said focusing motor assuming in the rest position a center position with respect to said first mentioned switch (9) so that upon movement of said one-armed lever in one direction the focusing motor is started to rotate in one direction while upon movement of said one-armed lever in the other direction said focusing motor is caused to rotate in the other direction, and two one-armed levers arranged parallel and adjacent each other, means for pivotally mounting opposite ends of said one-armed levers in the housing of the camera, handles attached to each free end of said one-armed levers, a pin and slot connection connecting said one-armed levers between the ends thereof, said one-armed levers being adapted to selectively effect a motorized focusing of said objective, one of said one-armed levers being provided with two outwardly extending tongues forming abutments, a rotatable coupling member (21) bridging said two abutments and having a recess with limiting surface adapted to engage one said abutments at a time, an actuating member on one of said two one-armed levers for operating a switch for a focusing motor, and means for operatively connecting said coupling member with said focal length adjusting means.

3. Camera according to claim 2, including a return spring (36) operatively connected with at least one of said one-armed levers which maintains said levers when not operated in a central rest position.

4. Photographic camera with an objective provided with a motorized focal length and distance adjusting means, including means which focuses the objective and provides an impulse for automatically adjusting the objective toward the long focal length, said means comprising an operating handle (6, 49, 51) for initiating a motorized focusing of the objective, and focal length adjusting means (17, 18, 21, 30, 31, 39) operatively connected with said handle, said handle when being operated to cause a motorized focusing of the objective effecting also an adjustment of said objective toward the longer focal length, regardless of what direction the focusing movement takes place, said above mentioned handle being attached to the free end of a one-armed lever (4, 5) this lever being pivoted adjacent to its other end, an actuating member (8) carried by said lever, a switch (9) for a focusing motor, said switch being arranged to be operated by said actuating member, another actuating member (17, 18, 21), another switch (25) for a focal length adjusting motor and operable by said other actuating member, said one-armed lever being provided between its ends with two spaced abutments (17, 18) and forming a slot therebetween in said one-armed lever, a rotatable coupling member (21) for bridging said two abutments and operatively connected with said other switch for the focal length adjusting motor, a stationary pivot pin on which said rotatable coupling member is mounted, spring means on said pivot pin for causing oppositely arranged parallel limiting surfaces (27, 28) formed by a recess (26) in said coupling member (21) to engage one of the said abutments at a time, the distance between said parallel limiting surfaces of said recess being so dimensioned that in cooperation with said abutments (17, 18) on said one-armed lever sufficient clearance for the switching movement of said one-armed lever for starting and stopping of the focusing motor and the focal length adjusting motor is provided, said actuating member (8) for the first mentioned switch (9) of said focusing motor assuming in the rest position a center position with respect to said first mentioned switch (9) so that upon movement of said one-armed lever in one direction the focusing motor is started to rotate in one direction while upon movement of said one-armed lever in the other direction said focusing motor is caused to rotate in the other direction, said operating handle comprising two separate handle members, one inner one and an outer one, of which the inner one is adapted to axially move into the other outer member a spring for urging one said handle in a direction to move it away from the other handle member, a slidable member arranged within the housing of the camera and operatively connected with one of its ends with the inner handle member, a bearing pin within said housing for slidable and rotatably supporting the other end of said slidable member, said outer handle member being movably mounted on an outer wall of said housing in a direction transverse to the longitudinal direction of movement of said slidable member, a switch (43) associated with an actuating member (42) on said slidable member for starting and stopping the motor which performs the focusing of the objective and to cause a rotation of said motor selectively in one and the other direction when said outer handle member is moved along said outer wall, another switch (54) in said housing associated with the motor for adjusting the focal length of said objective, said other switch being operated by said slidable member to control the operation of said focal length adjusting motor when said inner handle member is pushed against the action of said spring into said outer handle member.

5. Camera according to claim 4, in which said first named switch (43) is provided with spring means for maintaining said actuating member (42) on said slidable member (39) in a central position in which the focusing motor is inoperative.

6. Camera according to claim 4, in which said other switch (54) is adapted to be operated by the end of said slidable member which is opposite that end which is operatively connected with said inner handle member.

* * * * *